Nov. 20, 1945.　　　A. H. THOMAS　　　2,389,394
ELECTRIC MATHEMATICAL EDUCATIONAL APPLIANCE
Filed Feb. 19, 1944　　　4 Sheets-Sheet 1
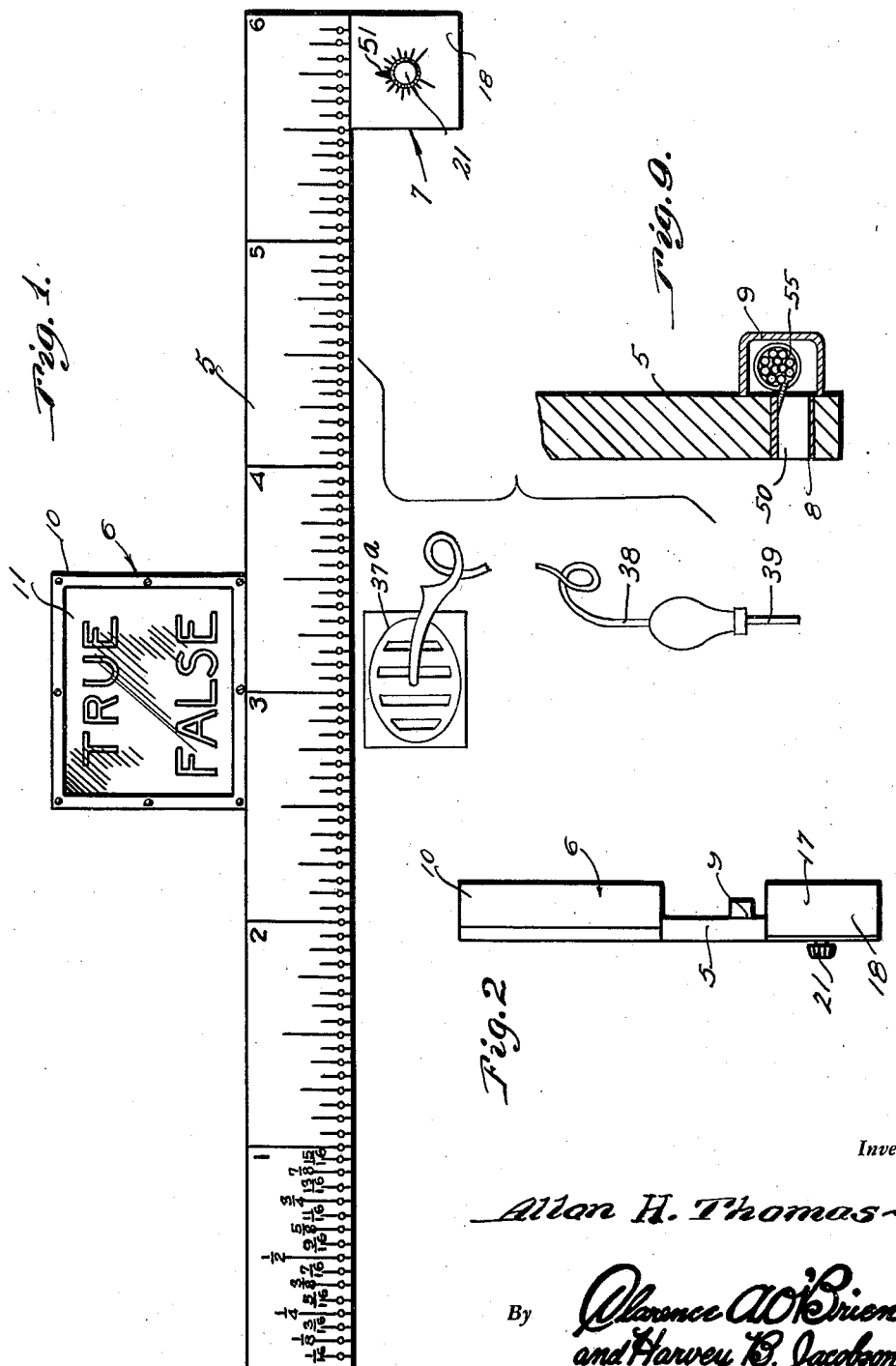

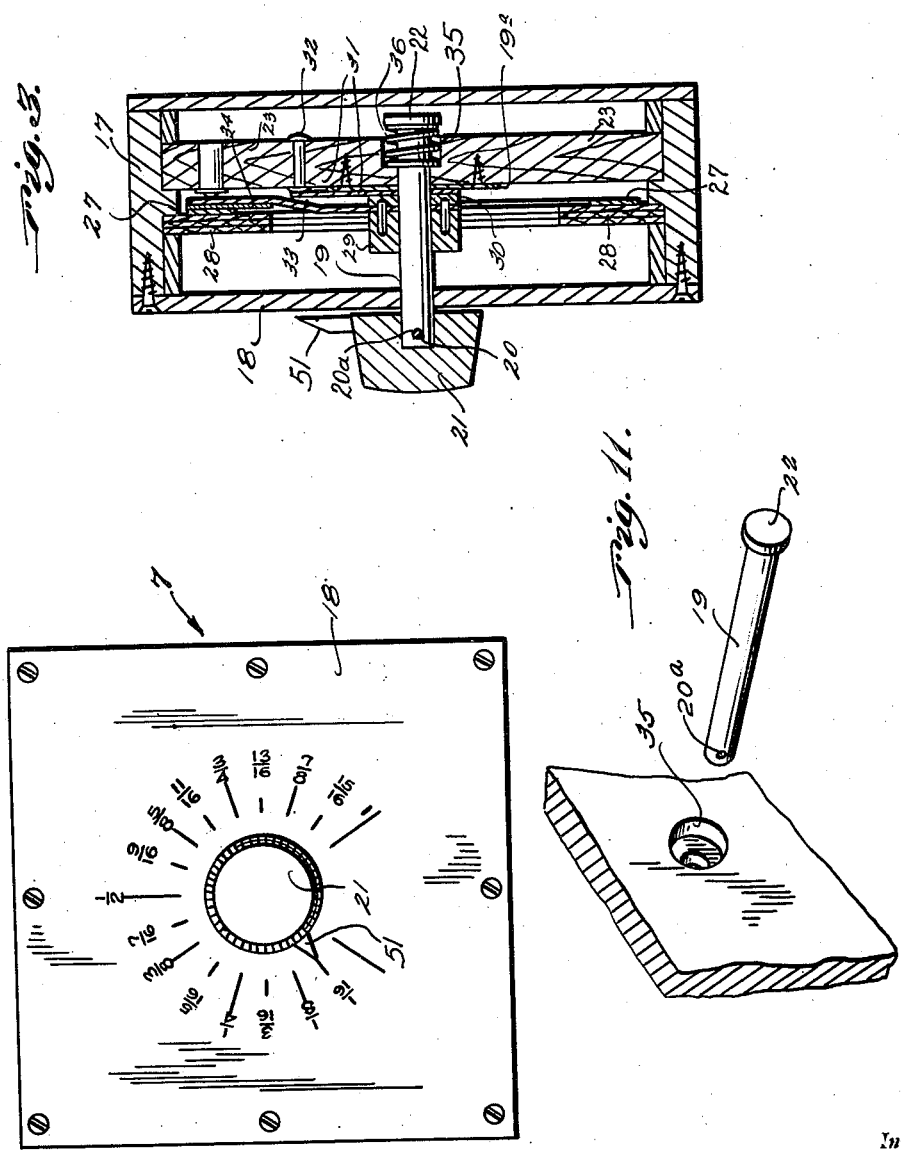

Nov. 20, 1945.    A. H. THOMAS    2,389,394
ELECTRIC MATHEMATICAL EDUCATIONAL APPLIANCE
Filed Feb. 19, 1944    4 Sheets-Sheet 3
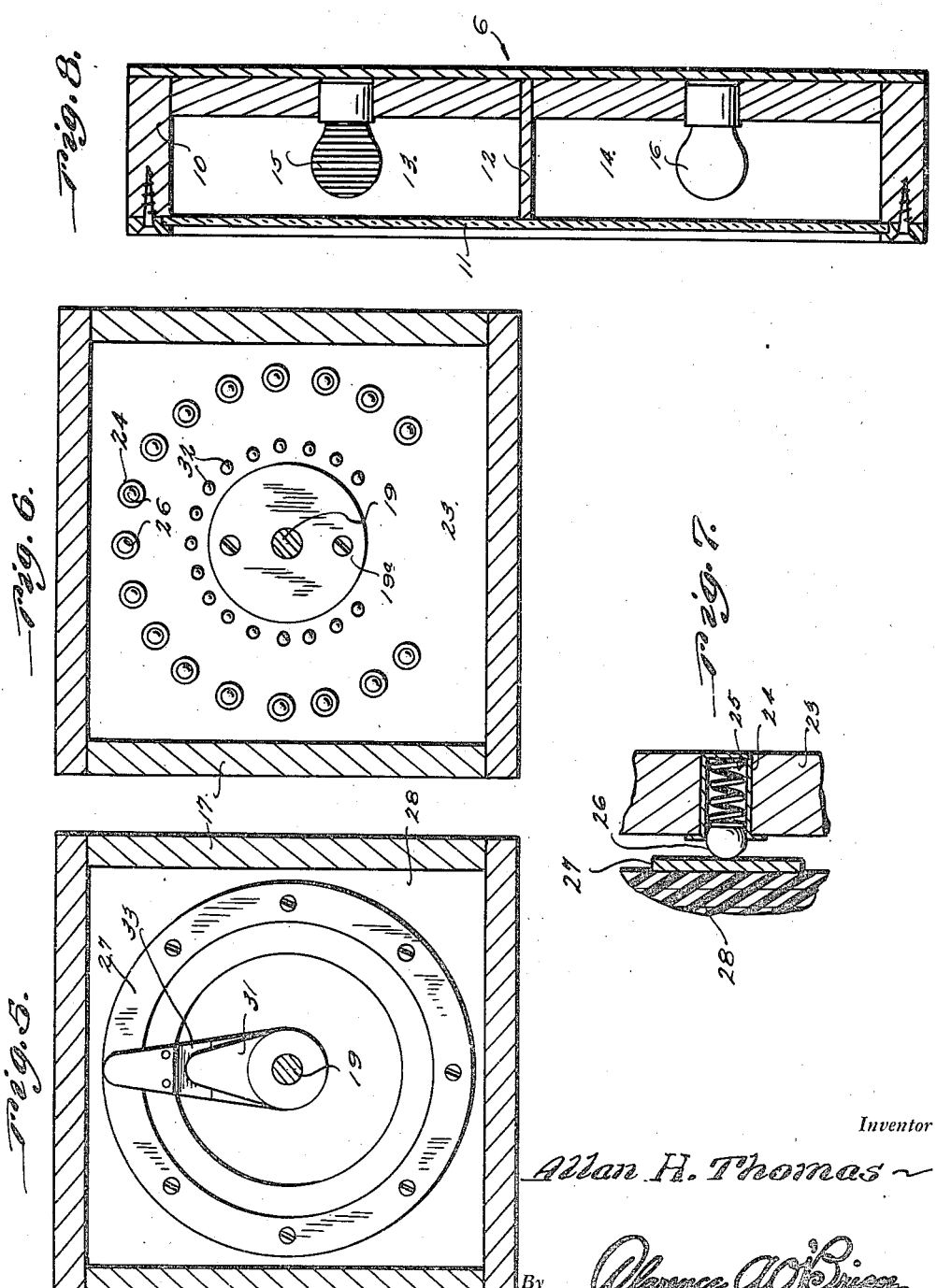
Inventor
Allan H. Thomas

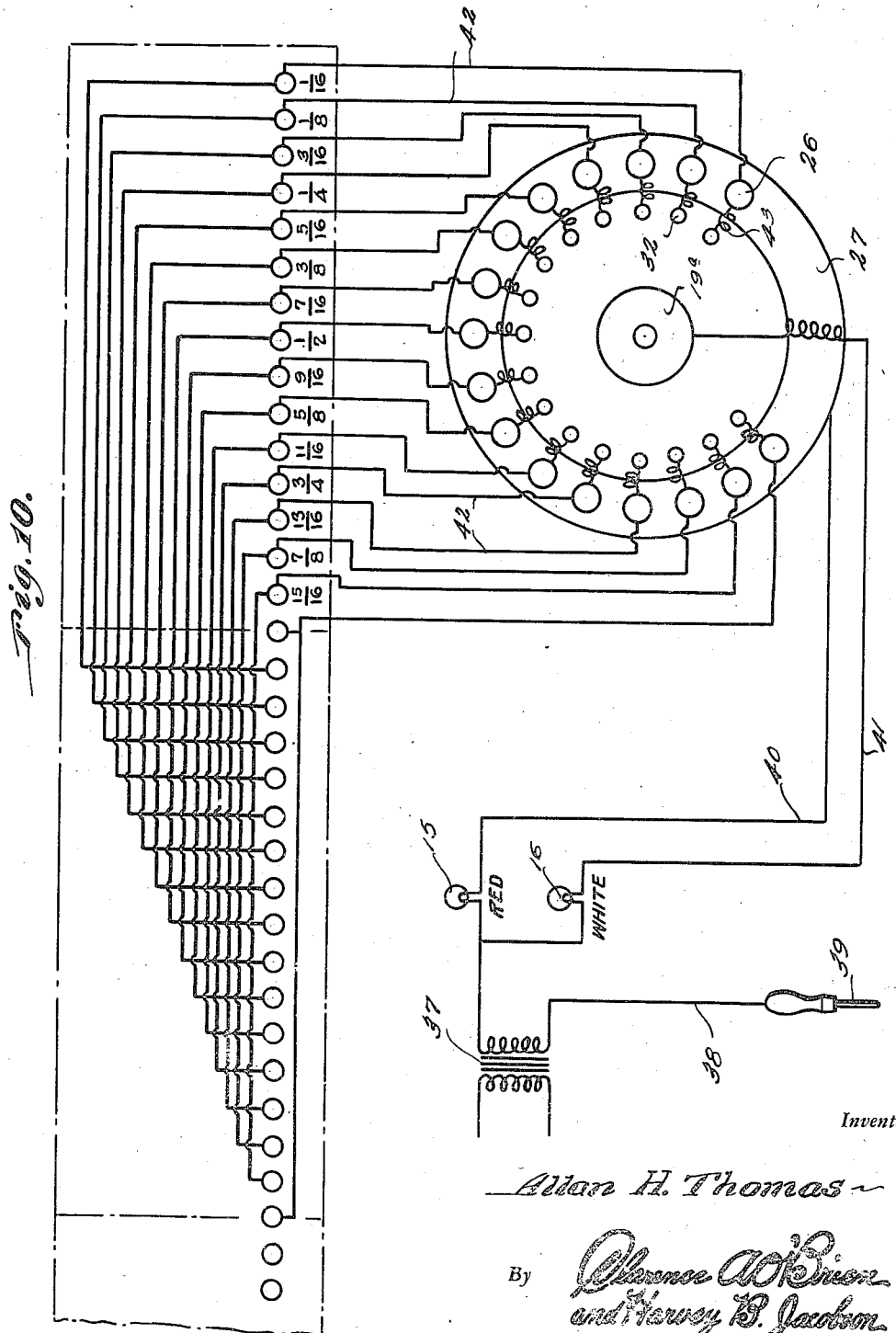

Patented Nov. 20, 1945

2,389,394

UNITED STATES PATENT OFFICE 2,389,394

ELECTRIC MATHEMATICAL EDUCATIONAL APPLIANCE

Allan H. Thomas, Butte, Mont., assignor of one-half to Joseph L. Lenz, Butte, Mont.

Application February 19, 1944, Serial No. 523,141

2 Claims. (Cl. 35—48)

This invention relates to improvements in educational appliances which are of assistance in teaching students and it has for its principal object an electrically operated teaching aid for teaching the use of measuring instruments or appliances employing scales sub-divided in fractions, such as a rule showing length units subdivided into fractional units.

To acquaint the student with the numerical values represented by the divisions and sub-divisions of a rule or of scales or of instrument carrying scales, to help in finding the location of a division corresponding to a numerical value, to test the correctness of simple operations such as additions of fractions and for similar purposes, a rule showing the division into inches and fractions of inches is provided in which every division mark or a selected number of division marks is equipped with electric contacts. These contacts are connected with an adjustable test switch, with an indicator and with a test contact; the test switch may be set in such a way that the indicator shows the indication "correct" for this mark when the contact allocated to the mark representing the correct result is touched by the test contact, and it shows the indication "incorrect" or "false" when a contact associated with any other mark on the rule is touched.

Educational, amusement and test apparatus of the same general type attempting to instruct or amuse children or to supply psychological or ability tests have been proposed in various forms; but their functions are more or less performed by establishing a fixed connection between contacts to be tested and allotted to a question and other contacts allotted to the answer. The question is usually brought into some kind of relation to one of a series of contacts to be tested by means of cards, strips or sheets carrying a printed text or provided with pictures or marks or the like; and similarly each of a series of answers is brought into some relation with one of a series of contacts which may be arranged either in rows, in squares or in a circle around a rotating switch. When the contact related to the right answer is touched, a signal of some kind indicating that the answer was correct is given.

When psychological or ability tests are made, contacts to be tested are provided with a variety of signals so that the ability or psychological condition can be judged by the frequency or nature of the signal.

Educational apparatus of this type are merely useful for children below the grade school age. For on account of the fixed connection between the contacts allotted to the question and to the answer students above grade school age would consciously or unconsciously quickly memorize the relative location of the contacts and the educational value would, therefore, be very small or nil. This drawback would still subsist if an attempt were made to change the connections occasionally.

The educational appliance according to the present invention permits to give answers to questions individually as there is no mechanical or fixed relation between question and answer. The answer for the individual question has to be supplied either by the teacher or by the student himself or by using a system of correspondence between marks when adjusting the adjustable switch. The adjustment of the apparatus in accordance with the correct answer has therefore to be made before the correctness of the answer given by the student can be tested and in this respect the invention differs basically from the appliances heretofore proposed.

The educational value of such an appliance is much greater than that of oral teaching on account of the participation of the pupil who, in the event that more elementary problems such as naming the numerical value of the division marks pointed out to him or of locating a given division mark may supply the answer himself by adjusting the test switch in accordance with the mark.

The means for obtaining this result consists mainly in the connection of each contact allotted to a graduation mark with two series of contacts on a test switch. One series of contacts on said switch is permanently connected with contacts of the graduation marks to be tested and to the signal "incorrect." The other series of contacts of the switch is connected with the indicator giving the signal "correct" and one of them is connected with an individual contact of the graduation scale by the adjustment of the test switch. This adjustment also disconnects the corresponding contact of the first-named series from the graduation mark contacts. Thus, after adjusting the test switch in accordance with the answer corresponding to the questions one and only one contact associated with the graduation marks will be singled out as furnishing the answer "correct." The insertion of the test plug into the socket of any one of the other graduation mark contacts will actuate the signal "incorrect."

It is seen that no permanent connection exists between the graduation marks and the indicator.

Each graduation mark contact may be connected with the indicator notifying the student that his answer is correct and the selection is solely determined by the adjustment of the test switch.

Other objects and advantages of the invention will become apparent to the reader of the following description.

In the drawings:

Figure 1 represents a front elevational view of the device.

Figure 2 is an end elevational view.

Figure 3 is a vertical sectional view through the selector.

Figure 4 is a front elevational view of the selector.

Figure 5 is a vertical sectional view through the selector.

Figure 6 is a vertical sectional view through the selector showing the ball contacts.

Figure 7 is an enlarged detailed sectional view showing one of the ball contacts in contact with the opposed ring.

Figure 8 is a vertical sectional view through the lamp box.

Figure 9 is a cross sectional view through the rule.

Figure 10 is a diagrammatic view showing the electrical connections between the electrical devices involved.

Figure 11 is a fragmentary perspective and exploded view showing the shaft of the selector (see Figure 3).

Referring to the example illustrated in the drawings wherein like numerals designate like parts, numeral 5 denotes an elongated rule, which for classroom use will be say six feet long, each foot representing one inch.

Mounted in juxtaposition with respect to the rule 5 is a lamp box generally referred to by numeral 6 and further in juxtaposition with respect to the rule 5 is a selector or test switch generally referred to by numeral 7 and a test contact 39 connected by a cable 38 to the transformer box 37a of a transformer 37 (shown in Figure 10) connecting the arrangement with the mains.

The rule 5 is laid off in sixteenths of an inch or in smaller or larger divisions of fractions, if desired, and at each graduation, the rule has an opening or aperture 50 in which is disposed a tube 8 of current conductive material. A conduit 9 extends along the rear side of the rule 5 and this conduit houses a multi-conductor cable 55 containing insulated strands or conductors each of which is connected with one of the tubular contacts 8.

As explained later corresponding contacts belonging to the same unit fractions in the various units may be connected with the same strand or conductor to reduce the number of conductors in the cable.

The lamp box 6 consists of a case 10 having a window 11 at the front side thereof and this case 10 is divided by an internal horizontal partition 12 dividing the interior into upper and lower lamp compartments 13, 14, respectively, (Figures 1 and 8) containing bulbs 15, 16 of different colors, the upper bulb 15 being for instance red while the lower bulb 16 is white. Words such as "true" and "false" are preferably located on the inner sides of the upper and lower portions of the pane 11, covering the compartments 13 and 14. The pane 11 is preferably frosted or otherwise made translucent, so that when one or the other of the two bulbs is lighted this word will become visible.

The selector or test switch 7 consists of a casing 17 closed at the front by a plate 18 screwed down on the casing which carries markings corresponding to the markings of the fractions on the rule 5. If all the fraction markings in the successive units are connected to one and the same conductor, as explained below, only one series of fraction markings is necessary. However, if the fraction marking of successive units should be connected to different conductors in the cable, the markings on the test switch have to include as many fractional markings as there are units.

Within the casing 17 there is a partition wall 23 and an annular partition 28 at some distance from each other both consisting of insulating or non-conducting material such as wood, plywood, plastics or the like.

The annular partition wall 28 carries a single annular contact plate 27 on its inner side facing the partition 23, while the latter carries two series of concentric contacts. The inner series consists of contacts 32 formed by bolts or rivets firmly secured in the partition walls. Each contact corresponds to one of the fractional units.

The outer series comprises similar contacts, each preferably arranged in radial alignment with one of the inner contacts 32 and each consisting of a metal cup or cup-shaped socket 24 from which a contact ball 26 projects. Said ball is urged towards the front end by a compression spring 25 pressing against the closed end of the cup-shaped socket 24. The cups 24 face the annular metal plate 27, so that normally the ball 25 is pressed against said plate and establishes contact with it.

Cooperating with the two series of contacts are two arms 31 and 33 rotatably arranged on a shaft 19. Said shaft is provided at its rear end with a head 22 against which a spring 36 is pressing. The spring finds its support in a recess 35 of the partition wall 23. The spring urges the shaft 19 and the arms 31 and 33 mounted on it towards the partition wall.

The said shaft carries two blocks 29, 30 of insulating material upon which the arms 31, 33 are mounted. The arm 31 which is of the usual contactor arm type is mounted on the front end of block 30. This contactor arm cooperates with the inner series of contacts 32 and it is held in conductive engagement with an annular disk 19a surrounding the shaft 19 and fixed on the partition wall 23. As the contactor arm 31 mounted on block 30 carried by the shaft 19 is urged towards the partition wall by spring 36, the metallic central part of the arm is pressed against disk 19a and is, therefore, capable of establishing contact with said disk.

The second arm 33, although having the appearance of a contactor arm is not a contact making arm. It is insulated from shaft 19 and the other arm 31 by the blocks 29, 30 between which it is mounted. It consists of a metallic arm which carries on its rear face an insulating piece 34. When turned to a specific contact 24, it will press back the wall 26 and interpose itself between it and the annular contact 27 and by means of the insulating piece 34 will separate the ball 26 of the contact 34 on which it rests from the said annular contact 27.

As both arms 31 and 33 move together by virtue of their being mounted on the insulated blocks 29, 30 carried by the shaft 19, arm 31 when set on a specific contact of the series will establish contact with one of the contacts 32 of the inner series while the arm 33 will interrupt contact of the corresponding contact 24 of the outer series with the annular disc 27.

The shaft 19 protrudes from the casing passing through a hole in the cover plate 18 and on this protruding part carries a knob 21 fixed on the shaft by means of a pin 20 passing through a hole 20a of the shaft. The said knob carries a pointer or indicator 51 running over the marks on the cover plate permitting to adjust the knob and with it the shaft and the parts carried by it in the desired manner.

Electrical connections are made as will be more fully explained with the disk 19a, connected with a conductor 41. Each of the contacts of the series 24, 26 or 32 is connected with one of the conductors 42 and between corresponding contacts of the two series are conductors 43. Moreover, the annular disk 27 is connected with a conductor 40.

As will be seen from Figure 10, each socket 8 in the apertures 50 associated with one of the inch fractions is connected by means of a conductor 42 of the multi-conductor cable with one of the ball contacts 26 of the outer series and, by means of the conductors 43, with the corresponding contacts 32 of the inner series. The annular disk 27 against which all the contact balls 26 are pressed with the exception of the one resting against arm 33, is connected by means of conductor 40 with the red light indicating the "false" answer.

Contact disk 19a, however, which establishes contact with arm 31 is connected with conductor 41 containing the white light (indicating a correct answer). Both branches 40 and 41 may join and are connected with the secondary of a bell or step down transformer 37, which is enclosed in the casing 37a. The other end of the secondary is connected with the test plug 39 or test contact. The primary of the transformer is connected with the power mains as usual.

From Figure 10 it is apparent that the contact allotted to the successive inches and fractions of inches are connected in series with the sockets of the other inches or fractions of inches.

This series connection is made in the modification shown merely because the separate connection of each graduation mark for each fraction of an inch, even if the inch is divided merely into one-sixteenth inch fractions would entail a large number of contacts and conductors. It has been found by experience that errors as regards the numerical value of an inch mark are very rare or practically do not occur at all especially if the numerical values of the inches are plainly written on the scale of the rule. Errors of this type, if occurring, are easily corrected by the teacher or the student so that the small disadvantage due to the failure of the indicator to indicate the inch value can be tolerated in view of the greater economy obtained by the reduction of conductors and contacts. Jumpers 42 extend from each of the sockets 8 to the corresponding ball contacts 26 and also to the corresponding contacts 32 by short jumpers 43.

The operation of the device is the following:

Assuming that the apparatus is used to train the student in the immediate recognition of the fraction mark to which the teacher is pointing or in finding a fraction mark on the rule the numerical value of which is mentioned by the teacher, the teacher may set the pointer 51 of the test switch 7 to the mark which he wants to be pointed out by the student. If the cooperation of the student is desired the adjustment of the switch 7 may be left to the student himself and is performed after the answer has been given. When the student approaches the rule 5 with the test contact 39 and inserts this in the proper contact tube 8, current will flow through the transformer 37 and contact plug, tube contact 8 and the corresponding jumper 42 to the proper ball contact 26 but cannot reach the ring 27 because of the interposition of the piece of insulation 34 carried by the contactor 33, current will flow however, to the contact 32 allotted to the graduation mark into which the test contact was inserted and the contact 31 will carry the current to the conductor 41 and from there by way of the white lamp 16 to the other side of the secondary of the transformer.

However, had the student made the wrong selection by inserting the answer pin 29 in, for instance, any one of the adjacent fraction sockets, the current would flow from the ball contact 26 to the ring 27 and from there to the red lamp 15, due to the fact that the ball contacts are engaged with the ring 27 so that the selection of any one of these will close the circuit of the lamp 5 and will be indicated by the signal "false."

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A didactic measuring apparatus for training persons in the use of measuring systems comprising a rule provided with graduation marks indicating several length units and small fractions of said units, each graduation mark being provided with a contact, and corresponding fractional contacts in successive units being connected with each other, a switch provided with two rows of contacts, each contact of a row being connected with one of the graduation mark contacts, two indicator signals arranged in different circuits and a test contact arranged in a branch common to both aforesaid circuits said test contact being manipulated by the person using the apparatus and adapted to be brought into operative connection with the graduation mark contacts, a manually operated sliding means on said switch, said switch being provided with means for closing all the circuits connected with one indicator signal over any one of the connections between switch contacts and graduation marks but one, when the test contact is operated, and further provided with means for opening all the circuits through the other indication signal while at the same time closing the circuit of one contact and graduation mark through said signal.

2. A didactic measuring apparatus for training persons in the use of measuring systems comprising a rule provided with graduation marks indicating several length units and small fractions of said units, each graduation mark being provided with a contact, and corresponding fractional contacts in successive units being connected with each other, a switch provided with two rows of contacts, each contact of a row being connected with one of the graduation mark contacts, two indicator signals arranged in different circuits and a test contact arranged in a branch common to both aforesaid circuits, said test contact being manipulated by the person using the apparatus and adapted to be brought into operative connection with the graduation mark contacts, a manually operated sliding means on said switch, comprising an insulating and a conducting member in contact with all the contacts of one row, the insulating member sliding between said contact member and the individual contacts, and adapted to separate one contact at a time from the contact member, a contactor arm operating on the second row, adapted to make contact with one contact of this row and operative connections between said common contact member and one indicator signal and said contactor arm and the other indicator signal.

ALLAN H. THOMAS.